Patented Feb. 26, 1924.

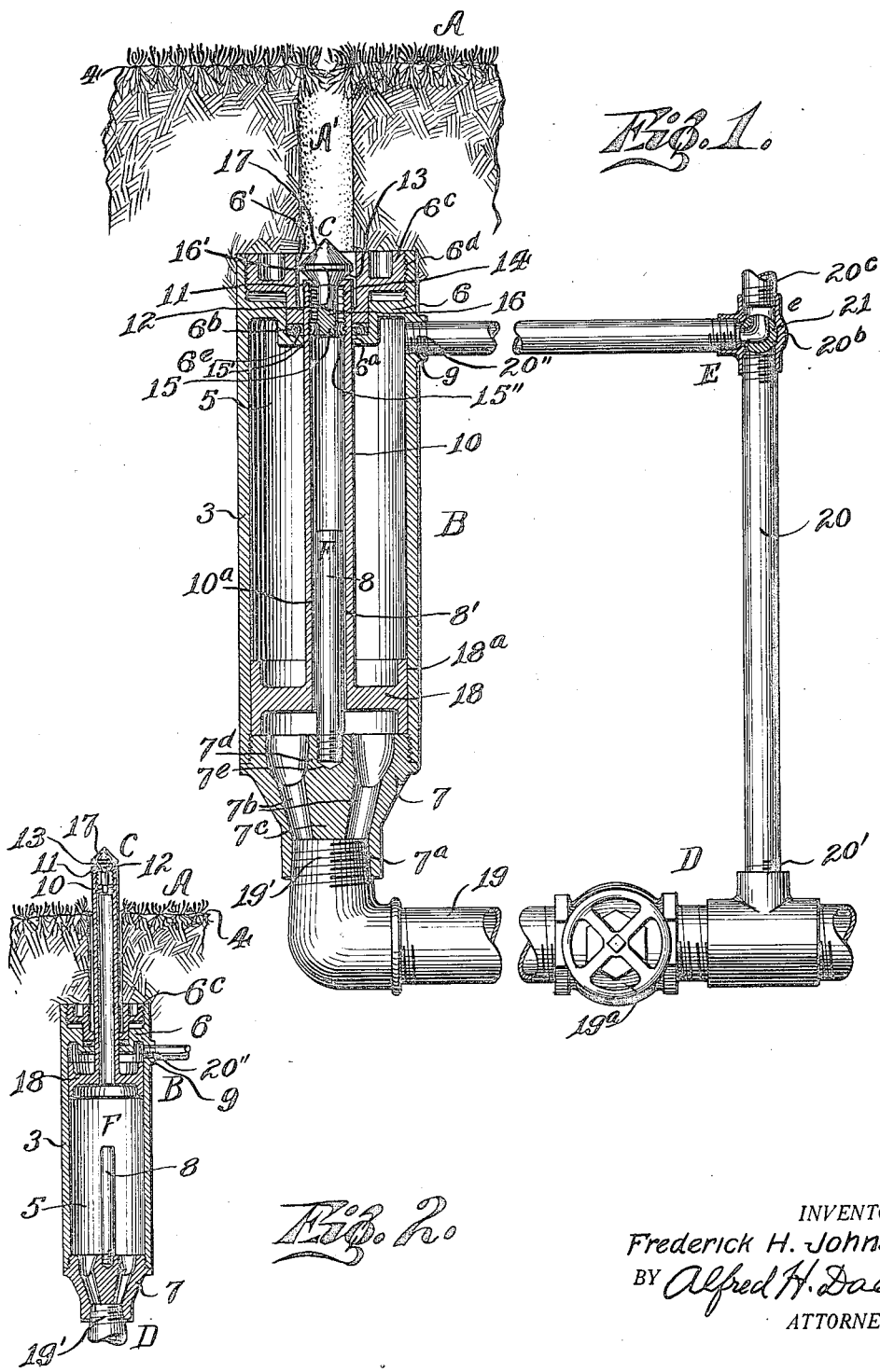

1,484,888

UNITED STATES PATENT OFFICE.

FREDERICK H. JOHNSON, OF SOUTH PASADENA, CALIFORNIA.

DISAPPEARING LAWN SPRINKLER.

Application filed January 10, 1922. Serial No. 528,222.

*To all whom it may concern:*

Be it known that I, FREDERICK H. JOHNSON, a citizen of the United States, residing at South Pasadena, in the county of Los Angeles and State of California, have invented new and useful Improvements in Disappearing Lawn Sprinklers, of which the following is a specification.

This invention relates to sprinklers and more particularly to lawn sprinklers, and it has for its object to provide a disappearing or normally underground or concealed sprinkler, the spraying or like device of which is positively projected to a position above the surface of the ground where it is maintained during its period of activity and which is positively retracted to a position at an appreciable distance beneath the surface of the ground.

The spraying devices of underground sprinkling systems as ordinarily constructed are unsuitable for use where a relatively unbroken ground surface is required or desired, as in the case of fine lawns, athletic fields, golf greens, croquet grounds and the like, the unsightly, large, metallic sprinkler heads or spraying devices thereof interrupting and destroying the continuity of earth surface or grass plot.

In accordance with the present invention and in the preferred practice thereof, I provide a spraying head or device which is of relatively small diameter and which is normally retracted and housed in concealed position beneath the surface of the ground, positively acting means for forcing the device to its working position above the surface of the ground, and positively acting means for returning the device to its retracted and concealed position; furthermore, I may provide means for restricting the flow of water through the orifice or orifices of the spraying device during a portion of the outward travel thereof under urgence of the first named positively acting means; by this provision I am enabled to produce a disappearing sprinkler, the spraying nozzle or spraying device per se of which may be forced outwardly sufficiently far above the surface of the ground to prevent any erosion or washing away of the ground which immediately surrounds the sprinkler by water escaping from the spraying device, before the full flow through the device takes place. As the positively acting means employed will force the sprinkler through dirt, sod or grass, and the clogging or filling up of the aperture or bore of small diameter in the ground immediately above the spraying device cannot prevent the operation of the sprinkler, it will be seen that the same is especially well adapted for use in plots of ground of the nature above outlined, as well as for use under many other conditions.

A further object of the invention is to provide a sprinkler of the general character which will be relatively simple and inexpensive in construction and operation when its advantages and features such as positiveness in operation, high efficiency, perfect concealment during inactivity, and general superiority in service are considered.

With the above and other objects in view, the invention consists in the novel and useful provision, formation, combination, association and relative arrangement of parts, members and features, all as hereinafter described, shown in the drawings, and finally pointed out in claims.

In the drawing:

Figure 1 is a central vertical sectional view of a sprinkler constructed, organized and installed in accordance with the invention, a mode of connecting the same with water supply means being shown and the spraying device being shown in retracted or concealed position beneath the surface of the ground; and Figure 2 is a central vertical sectional view of a portion of the showing of Figure 1, but with the spraying device in working position above the surface of the ground.

Corresponding parts in both the figures are designated by the same reference characters.

Referring with particularity to the drawing, in the embodiment of the invention therein shown, A designates a lawn, B designates, generally, the sprinkler, C designates the spraying device thereof, D designates fluid pressure supply means for positively forcing the device C upwardly to its working zone above the surface of the lawn, and E designates fluid pressure supply means for positively retracting the device C to its housed and concealed position below the surface of the ground.

The sprinkler B is shown as comprising a main cylindrical body portion 3 installed completely below the surface 4 of the ground or lawn A and having a bore 5, an upper cylinder head 6, a lower cylinder head 7, together with the parts and means C, D and E. The upper cylinder head 6 has a central bore 6ª about which a stuffing box 6ᵇ is formed, a gland 6ᶜ threadedly engaging the head 6 as at 6ᵈ and adjustably confining the packing 6ᵉ in the stuffing box. The bore of the gland 6ᶜ is enlarged as at 6' to provide for housing the spraying device or head. The lower cylinder head 7 has a threaded fluid inlet aperture 7ª which is branched into ducts as at 7ᵇ, partitions 7ᶜ between the ducts supporting a central boss 7ᵈ. This boss 7ᵈ has a threaded aperture at 7ᵉ in which the lower end of an upstanding cylindrical valve member 8 is received and supported. The valve member 8 extends vertically along the cylinder axis to a point approximately half way between the cylinder heads 6 and 7 and forms part of flow-restricting means F. Just below the upper cylinder head 6 the wall of the cylinder 5 is provided with an apertured and internally threaded boss 9, through the aperture of which communication is established between the fluid pressure supply means D and the interior of the cylinder.

The spraying head or device C is shown as comprising a nozzle device and its valve or spreader preferably constructed by providing a tubular plunger piston rod 10 of relatively small diameter with an internal bevel face 11 at its extreme upper end, and positioning a spreader 12 having a bevel valve portion 13 at its under face in or at such upper end of the piston rod 10 with the bevel faces 11 and 13 in properly spaced relation. The upper end of the tubular piston rod 10 is internally threaded as at 14 and a head 15 formed at the lower end of an axially extended stem 16 preferably made integrally with the spreader 12 is threadably engaged with the internal threads of the tubular piston rod 10. The head 15 is cut away at a plurality of places, as at 15' and 15" to provide water passage therethrough. The spreader 12 has a short, cylindrical formation 16 at the upper terminus of its under bevel face or valve portion 13 and terminates at its upper end and above the cylinder in a conical formation 17 which serves as a piercing point for sod or other overlying formations as well as assisting in the proper directing or jetting of drainage water from the cylinder during the retraction of the nozzle device. The spraying effect may be regulated by adjustment of the spreader with respect to its opposed bevel face 13.

Below the nozzle or spraying device A the tubular piston rod is extended as at 10ª to coact with the upstanding cylindrical valve member 8, the extension 10ª being so comprised within the means F; a slight annular space 8' between the member 8 and the piston rod extension 10ª when the two are in juxtaposition, as shown in Figure 1, provides for the escape or leakage of the aforementioned drainage water from the cylinder through the nozzle device. At the extreme lower end of the piston rod extension 10ª, a laterally extending piston 18 is formed. The piston 18 is fitted at its periphery 18ª to the interior cylinder wall, so as to have a leak-proof working fit thereagainst. The intermediate portion of the piston rod 10 is adapted to reciprocate in the bore 6ª of the cylinder head 6.

The fluid pressure supply means D may comprise a supply pipe 19 having its one end 19' fitted into the threaded inlet aperture 7ª of the lower cylinder head 7 and having its other end connected with any suitable supply or head of water. A shut-off valve 19ª, shown in the pipe 19 to control the supply of water to the sprinkler, may constitute controlling means having the dual or combined function of initiating activity of the sprinkler by first admitting fluid pressure thereto to cause the forcing of the spraying device into operative position above the surface of the ground, and controlling the time period during which such fluid is supplied for sprinkling purposes, during which time period the fluid so controlled acts to maintain the spraying device in its elevated working position, such time period terminating upon the second or shutting-off actuation of the valve.

The fluid pressure supply means E is shown as a water supply pipe 20 which may use the source of supply of the pipe 19 as its source of supply by having its one end connected with the pipe 19 between such source of supply and the shut-off valve 19ª, as at 20', and having its other end 20" threaded into the aperture of the boss 9 on the cylinder 5 near the head 6 thereof; the pipe 20 is interrupted by a valve device constituting means e for controlling the pressure means E; such device may comprise a three-port casing 20ᵇ two of the ports of which are connected to the corresponding sections of the pipe 20 and the third port of which is a drain port and may be connected to a drain 20ᶜ, and a rotatable valve body 21 in such casing and adapted to be rotated to alternately supply pressure fluid to the cylinder and to discharge the pressure fluid so supplied thereto through the drain, all as will be understood by those skilled in the art to which this invention appertains.

The operation, method of use and advantages of the invention will be readily understood from the foregoing disclosure, taken in connection with the accompanying drawings and the following statement:

The sprinkler being embedded in the ground with the top thereof at an appreciable distance below the surface and suitably connected with the underground piping, and with the valve devices 19ª and e suitably located for manipulation, the valve body 21 being in position to connect the interior of the cylinder with the drain, the operator by opening the shut-off valve 19 will admit water under pressure to the cylinder 5 beneath the piston 18 and the valve 8 nearly closing the bore of the hollow piston rod, as shown in Figure 1, only a slight leakage or flow past such valve 8 and out at the spraying device takes place and such slight amount of fluid as does flow with the parts in such position, issues, if unobstructed, as a slender vertical jet, off the upper point of the spreader, due to the spreader formation, the main body of the water entering the cylinder acting against the underside of the piston 18 and applying great power, if necessary, to force the pointed end of the spraying device through the overlying stratum of soil, and to a working zone above the surface thereof; after the spraying device has cleared the surface of the ground, further movement thereof causes the complete separation of the valve 8 and the hollow piston rod extension 10ª and further flow through the spraying device orifice, as determined by the adjustment of the spreader with respect thereto takes place; the final working or spraying zone of the spraying device is reached when the piston 18 strikes the cylinder head 6 and further upward travel is prevented and the full force of the water is applied to the work of sprinkling as the water is directed over the large area demonstrated to be possible with sprinklers organized in accordance with the invention. The reciprocatory parts remain in such elevated position, as shown in Figure 2, until the shut-off valve is closed. The means E may then be brought into operation by admitting water under pressure to the top portion of the cylinder 5 above the piston 18, by simply reversing the position of the valve e in the pipe 20 whereupon the downward pressure upon the piston 18 becomes substantially as great as the upward pressure priorly used in projecting the spraying device upwardly, and the spraying device will so be positively acted upon to retract the same to its concealed and housed position beneath the surface of the ground; water in the cylinder 5 below the piston 18 may escape during the retracting of the spraying device by passing through the orifice thereof, and as the hollow piston rod again reaches the zone of the valve 8, a dash pot effect is had in the lower half of the return stroke of the reciprocatory parts; water from the cylinder issuing from the spraying device orfice during the lower half of the stroke and while the upper end of the spraying device is traversing the bore A' priorly formed in the ground or soil stratum above the sprinkler must pass through the slight annular space 8' and the flow being thereby diminished and the water issuing in the form of the aforementioned jet and off the point of the spraying device, will be directed upwardly through the bore A, and consequently cannot by tearing away the sides of the bore A enlarge the same into a craterlike hole as would be the case if a laterally directed jet issued from the nozzle device in its bore in the perforated stratum; the bore A' being of very small diameter and frequently grass covered does not interfere with the passage of a golf or croquet ball thereover, and as hereinbefore pointed out, the filling up of the same between succeeding actuations of the sprinkler cannot possibly prevent the actuation thereof; nor can packing of soil about the slender tubular projecting portion hold the same against retraction to concealed position upon actuation of the powerful retraction means.

Sprinklers constructed in accordance with the present invention are well adapted for use in connection with systems such as the system described and claimed in Letters Patent of the United States, granted to me December 2, 1919, Number 1,323,867, for systems and means of control; in such use I connect the pipes 3 and 21 of the system described in such Letters Patent with the lower cylinder head aperture 7ª and the aperture of the threaded boss 9, respectively, of the disappearing sprinkler herein described.

Having thus disclosed my invention, I claim and desire to secure by Letters Patent:

1. An underground lawn sprinkler comprising a body portion, a spraying device of relatively small diameter and having a piercing point mounted for reciprocation in said body portion, and means causing the travel of said spraying device in either of its directions of movement.

2. In an underground sprinkling system for lawns, athletic fields, golf greens, and the like, a sprinkler embedded in the ground so as to be entirely concealed beneath an overlying stratum of soil, said sprinkler including a spraying device and means for forcing the spraying device through the said overlying stratum of soil and to a working zone above the surface thereof.

3. In an underground sprinkling system for lawns, athletic fields, golf greens, and the like, a sprinkler embedded in the ground so as to be entirely concealed beneath an overlying stratum of soil, said sprinkler including a spraying device, means for forcing the spraying device through the said overlying stratum of soil and to a working zone above the surface thereof, and means for returning said spraying device to its retracted position after each actuation thereof.

4. In an underground sprinkling system for lawns, athletic fields, golf greens, and the like, a sprinkler embedded in the ground so as to be entirely concealed beneath an overlying stratum of soil, said sprinkler including a spraying device, hydraulic means for forcing the spraying device through the said overlying stratum of soil and to a working zone above the surface thereof, and hydraulic means for returning said spraying device to its retracted position after each actuation thereof.

5. In an underground sprinkling system for lawns, athletic fields, golf greens, and the like, a sprinkler embedded in the ground so as to be entirely concealed beneath an overlying stratum of soil, said sprinkler including a spraying device, means for forcing the spraying device through the said overlying stratum of soil and to a working zone above the surface thereof, means for returning said spraying device to its retracted position after each actuation thereof, and means for restricting the flow of water through the spraying device during a portion of its travel.

6. In an underground sprinkling system, a sprinkler embedded in the ground so as to be entirely concealed beneath an overlying stratum of soil, said sprinkler including a spraying device mounted for elevation above the said overlying stratum of soil and retraction from elevated position, and fluid pressure means for causing travel of the said spraying device in both of its directions of travel.

7. In an underground sprinkling system, a sprinkler embedded in the ground so as to be entirely concealed beneath an overlying stratum of soil, said sprinkler including a spraying device mounted for elevation above the said overlying stratum of soil and for retraction from elevated position, fluid pressure means for causing travel of said spraying device in both of its directions of travel, and means for controlling said fluid pressure means.

8. In an underground sprinkling system, a sprinkler embedded in the ground so as to be entirely concealed beneath an overlying stratum of soil, said sprinkler including a spraying device mounted for elevation above the said overlying stratum of soil and for retraction from elevated position, fluid pressure means for elevating said device, fluid pressure means for retracting said device, and means whereby said elevating and said retracting means may be controlled for alternate actuation.

9. In an underground sprinkling system, a sprinkler embedded in the ground so as to be entirely concealed beneath an overlying stratum of soil, said sprinkler including a spraying device mounted for elevation above the said overlying stratum of soil and for retraction from elevated position, fluid pressure means for causing the travel of said spraying device in both of its directions of travel, and means for restricting the flow of water through the spraying device during a portion of its travel.

10. In an underground sprinkling system, a sprinkler comprising a cylindrical body portion embedded in the ground so as to be entirely concealed beneath an overlying stratum of soil, a spraying device normally retracted in said body portion and adapted when moved upwardly to be forced through the said overlying stratum of soil and to a working zone above the surface thereof, a piston in said body portion, a hollow piston rod between said spraying device and said piston and communicating with the interior of said cylinder below said piston, fluid pressure supply means communicating with the interior of said cylinder, above said piston, fluid pressure supply means communicating with the interior of said cylinder below said piston, and means for controlling the supply of fluid pressure medium to the said cylinder.

11. In an underground sprinkling system, a sprinkler comprising a cylindrical body portion embedded in the ground so as to be entirely concealed beneath an overlying stratum of soil, a spraying device normally retracted in said body portion and adapted when moved upwardly to be forced through the said overlying stratum of soil and to a working zone above the surface thereof, a piston in said body portion, a hollow piston rod between said spraying device and said piston and communicating with the interior of said cylinder below said piston, fluid pressure supply means communicating with the interior of said cylinder above said piston, fluid pressure supply means communicating with the interior of said cylinder below said piston, means for controlling the supply of fluid pressure medium to said cylinder, and a valve member for partially closing the hollow of said piston rod during a portion of the travel of the rod.

12. In an underground sprinkling system, a sprinkler embedded in the ground so as to be entirely concealed beneath an overlying stratum of soil, said sprinkler comprising a cylindrical body portion, a spraying device mounted for movement through the said over-lying stratum of soil to a working zone above the surface thereof, said spraying device being of relatively small diameter and normally retracted in said body portion, a piston in said body portion, a hollow piston rod between the said spraying device and the said piston and communicating with the interior of said cylinder below said piston, fluid pressure supply means communicating with the interior of said cylinder above said piston, fluid pressure supply means communicating with the interior of said cylinder below said piston, and means for controlling the supply of fluid pressure medium to said cylinder.

In testimony whereof, I have signed my name to this specification in the presence of two subscribing witnesses.

FREDERICK H. JOHNSON.

Witnesses:
ALFRED H. DOEHLER,
ANNABEL STOCKMAN.